L. A. SEWARD.
Apparatus for Teaching Music.
No. 5,632. Reissued Oct. 28, 1873.
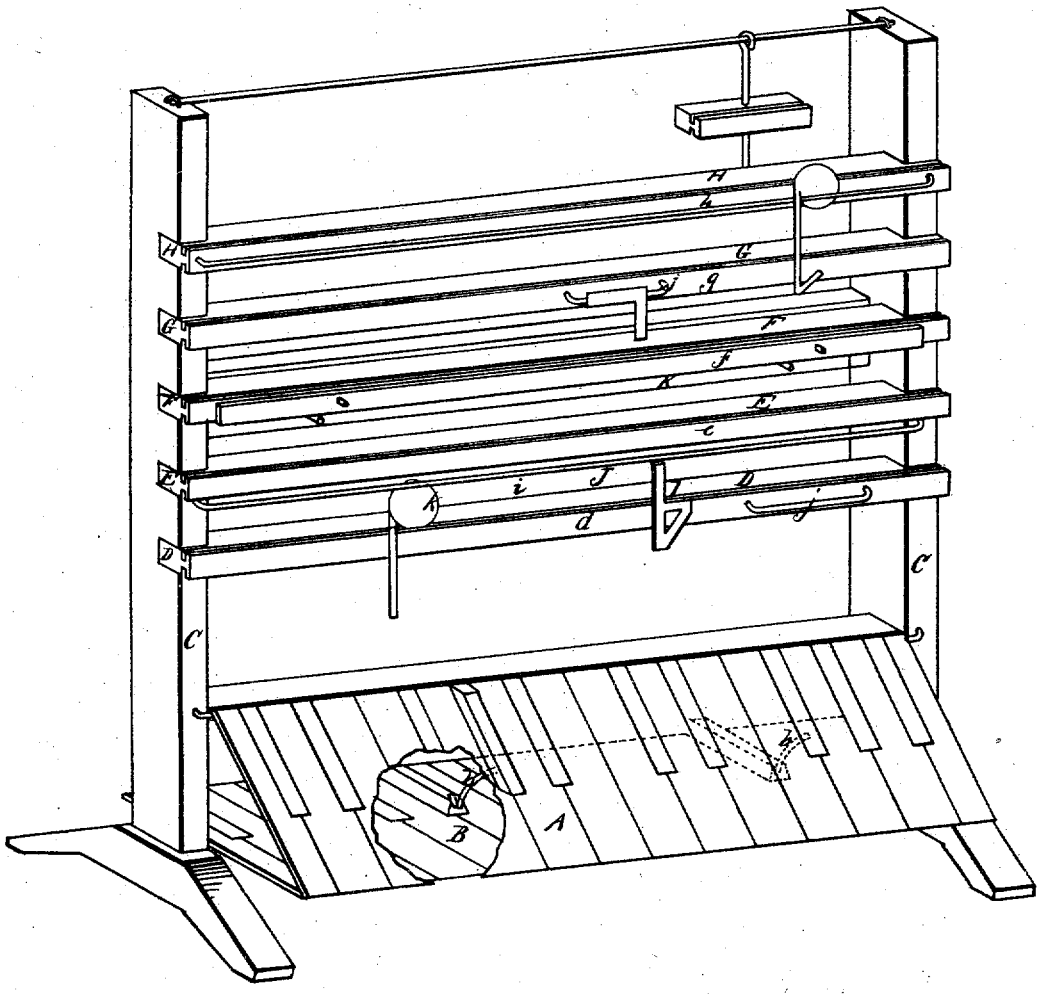
Witnesses
John L. Boone
C. M. Richardson
Lewis A. Seward
By Dewey & Co
Atty's.
AM. PHOTO-LITHOGRAPHIC Co. N.Y. (OSBORNE'S PROCESS.)

UNITED STATES PATENT OFFICE.

LEWIS A. SEWARD, OF SAN FRANCISCO, CALIFORNIA.

IMPROVEMENT IN APPARATUS FOR TEACHING MUSIC.

Specification forming part of Letters Patent No. 96,151, dated October 26, 1869; reissue No. 5,632, dated October 28, 1873; application filed September 16, 1873.

*To all whom it may concern:*

Be it known that I, LEWIS A. SEWARD, of San Francisco, in the county of San Francisco and State of California, have invented certain new and useful Improvements in Apparatus for Teaching Music, &c.; and do hereby declare that the following is a full, clear, and exact description thereof, that will enable others skilled in the art to which it appertains to make and use the same, reference being had to the accompanying drawings and to the letters of reference marked thereon, which form a part of this specification.

The utter impossibility of imparting musical instruction on the piano-forte and other instruments of like character, in consequence of the horizontal position of the key-board under the present form or plan of construction, is a fact well known to all teachers and musicians. It is also familiar knowledge to them that there is no existing arrangement which affords a means for communicating to the minds of pupils a clear and definite idea of the precise relations between the sounds of the keys and the written notes, and still less between these sounds and the different lines of the staff. The importance of my invention will, therefore, become at once apparent, when I state that it supplies a mechanical arrangement or means for teaching, at one and the same time, a hundred or more persons, while also indicating, with the greatest possible precision, the exact relations to which I have adverted between the keys and the written notes on the one hand, and between the keys and the staff-lines on the other.

My invention presents, moreover, a means by which children can be taught the rudiments of music under the operation of the controlling power and influence of their love of amusement, for it can readily be put in the form of a toy, which, calling forth and exercising their ingenuity in the construction of a musical staff, and the placing thereon the different notes and rests in their proper positions and relations to each other, will give, under the direction of a teacher, a perfect knowledge of the rudiments of music almost without a consciousness of the fact on their part. But the advantages of my invention are not confined to small children. It can be used with very great effect in teaching classes of adults, without regard to the number of pupils composing or who are embraced in the class, because it presents in visible and audible form, and in very expanded dimensions, if necessary, all things that are requisite to be learned before the nature and structure of the science of music can be thoroughly understood or correctly applied in instrumental practice. One teacher may, therefore, when aided by my invention, give the same measure or quantum of instruction to any given number of pupils, which, under present modes of teaching and present modes of constructing pianos, would require as many or nearly as many teachers to impart as there are pupils in the class. Nor is it necessary that my invention should always be connected with and attached to an instrument. In its toy form it will rarely ever be so connected and attached, a dumb representation of the present key-board being all that is necessary in that form of it, and even that is not always necessary to make it fulfill the object of imparting a correct knowledge of the fundamental principles of the science of music. In its separate or detached form, whether designed for the instruction of classes of young children or not, it may be made large enough to extend across the room in which the class is taught, while yet of sectional construction, and hence easily portable, because readily taken apart.

My invention consists of the combination of several novel and distinctive mechanical parts or features, but which are yet all embraced within the two principal features of an upright key-board and a frame-work on which are sustained one or more sounding-staffs, that, alike in their separate and associated characteristics, will be better understood by a reference to the drawing than from the most extended and carefully-drawn written description merely.

The first novel feature of my invention is a supplemental key-board, exactly corresponding in the number of its keys and the size thereof with the horizontal key-board with which it is combined, substantially as shown on the drawing—that is to say, the white keys of the upright supplemental board, the same being marked A on the drawing, are so placed that they rest near their outer extremities on the outer ends of the corresponding white keys of the horizontal board B, at such an inclination that a depression of any one of the former will cause a depression of the key of the horizontal board on which it rests, and thus sound the note to which the latter gives expression in the instrument. This arrangement necessitates a different kind of connection between the black keys of the two boards, and hence I establish the same by links or rods *b*, as clearly shown through the broken portion of the upright board on the drawing on the left-hand half of the same, and by dotted lines on the right-hand half at *b*. Above this duplex board, if I may so style the two combined keyboards, substantially as exhibited on the drawing, a light frame is elevated by means of the vertical standards C. This frame may be permanently connected to the instrument with which it is to be used, or be so constructed as to be detachable at pleasure; or, finally, it may be made so as to be used independently of any instrument, and in an entirely detached condition. Across this frame five horizontal wooden bars, D E F G H, are secured, as shown, to represent the five lines which, in music, constitute a staff.

In the practice of my invention, any number of staffs may be thus represented, and in every case there should be at least two.

To represent the musical sounds which pertain to the different lines and spaces of this staff, I employ movable notes *k* and rests *j*, which notes and rests can be removed at pleasure, and attached at any point upon either of the lines or in either of the spaces where their presence is required to denote a particular sound or tone, thus permitting the teacher to compose a tune upon the staff by the proper adjustment of the notes and rests. It will also be an advantage to the musical student to require him to place the notes upon the staff, as the mechanical operation of placing them in their proper places fixes the value, position, and relation to each other in his or her mind more readily than mere mental application could do it. Each of the wooden bars and the spaces between them should be connected, by means of proper links and trackers, with the keys of a musical instrument which represent the sounds that especially relate and belong to the lines of the staff of which they (the said wooden bars) are severally the representatives, so that, when the notes are placed in position, the mere touching or striking of the note will give the required sound or tone on the instrument. This arrangement constitutes what I call my sounding-staff, for it is through its agency that an instructor may at once indicate the appropriate sounds to his pupils that are especially related to each staff-line in music by simply touching the strips *d e f g h*, and thus causing the emission of the said several sounds. This arrangement of the keys in the wooden bars with mechanical connections with the keys of the piano I have not considered it necessary to show on the drawing, because it is of so simple a nature that it is readily comprehended without the aid of illustration by a drawing.

When the invention is used independently of an instrument, it will, of course, be understood that the above arrangement is wholly dispensed with, for the object for which it is designed—to wit, the exact relations between the sounds emitted by the keys and the lines and notes in a staff—cannot be indicated without an instrument.

A similar arrangement for indicating the sounds that belong to the intermediate spaces between the lines of the staff, and the relations of the same to the keys of the instrument, may be made through the agency of a rear board, J, and front elastic strips, like K, combined with proper keys, and links, and trackers, to cause said strips to actuate the keys of the instrument. But there is yet another way in which my invention assists the teacher to an extraordinary degree, and enables him to manage large classes with the greatest ease. The staff, which is represented by the five wooden bars D E F G H, presents a means for instructing pupils in any number, at one and the same time, how to place the notes and rests in music in so tangible a manner that the dullest intellect will at once comprehend the method, and hence be instructed in the primary principles on which all music is based, and the way in which they are practically applied. For it will be seen that each of these wooden bars is or must be provided, as well as the elastic strips in front of it, with some mechanical appliance for attaching metallic representations of notes, rests, &c., which, in large numbers, are to be kept on hand, in proper boxes or other receptacles, in such manner that said notes, &c., may readily be removed and put on again whenever necessary. These attaching appliances may consist of short staples, as shown at *j*, or of a wire that extends along the whole length of the bars, as shown at *i*, or of any equivalent device whatsoever, as well as of grooves in the bars, by which the notes, &c., may be put on by a direct insertion of them, as shown at *k*. If, now, we suppose my invention, thus provided, to be connected with an instrument and placed in view of a class of any number of pupils, it will be understood at once that the teacher may, either in his own proper person or by calling on one of the pupils, by simply striking on any given key, and then placing or causing to be placed the note which represents the sound given out by that key, instantly communicate and fix in the mind of every pupil a precise knowledge of music to that extent, and so on, until every key of the board has developed its own appropriate sound and been marked on the staff, and there has been fixed in the mind of every pupil a clear and definite knowledge of the same. It will, moreover, be plain, that with very little instruction, any intelligent child or youth may, with an instrument to which my invention has been annexed, take any piece of music, and, by placing the notes as written on the wooden representative of the staff, and touching the proper keys as he proceeds, very quickly acquire a considerable knowledge of music. It is equally obvious that, by reversing the operation, and by touching the front strips *d e f g h*, and sounding the notes that are represented by the corresponding lines of a musical staff, the teacher may, with facility and rapidity impart, or the pupil by his own effort may acquire, a complete knowledge of the relations between the keys or the sounds they create and the said lines of the staff, and the notes which pertain to them, respectively.

Thus it will be seen that my invention, inasmuch as it brings the key-board in effect before the eyes of every pupil in a class, however great their number, and shows in palpable form the relation of every one of the keys thereupon to every note and other musical symbol, as well as to each line of the staff on which the same are written, completely accomplishes every object designed by me, and paves the way for so cheapening musical instruction that there is none so poor as not to be able to receive it.

My invention is applicable to every instrument in which obtain key-boards at all similar to those of piano-fortes.

Having thus described my invention, what I claim, and desire to secure by Letters Patent, is—

1. A musical staff, D E F G H, constructed as described, provided with the wires *i* or equivalent, in combination with movable notes and rests, substantially as and for the purpose herein described.

2. The combination of an upright or partially upright supplemental key-board with the ordinary horizontal key-board of piano-fortes or other like instruments, when the former is used in connection with vertical standards *e e*, on which are fixed transverse bars D E F G H, and front elastic strips *d e f g h*, provided with mechanical appliances for attaching removable notes, rests, &c., and means of connection with the horizontal keys of the instrument, substantially as herein described.

3. The frame C, having the cross-bars D E F G H, with or without the front strips *d e f g h*, and provided with the upright or partially upright key-board, when the parts are constructed substantially as described, and for the purpose specified.

4. The combination of upright or partially upright supplemental key-board with a horizontal key-board, when the two are connected by links and trackers, or equivalent connections, substantially as and for the purpose described.

In testimony that I claim the foregoing I have hereunto set my hand this 5th day of September, 1873.

LEWIS ALFORD SEWARD.

Witnesses:

F. O. WEGENER,

C. MILTON RICHARDSON.